(12) United States Patent
Qiu et al.

(10) Patent No.: US 11,926,544 B1
(45) Date of Patent: Mar. 12, 2024

(54) BIOLOGICAL DESULFURIZER FOR REMOVING ORGANIC SULFUR IN FRACTURING FLOWBACK FLUID AND APPLICATION THEREOF

(71) Applicants: CHINA PETROLEUM & CHEMICAL CORPORATION, Beijing (CN); CHINA PETROLEUM & CHEMICAL CO., LTD. OF NORTH BRANCH, Zhengzhou (CN)

(72) Inventors: Xiaoqing Qiu, Zhengzhou (CN); Xiang Wang, Zhengzhou (CN); Guisheng Wang, Zhengzhou (CN); Guofeng Li, Zhengzhou (CN); Jiawei Zhang, Zhengzhou (CN); Lei Song, Zhengzhou (CN); Xia Wang, Zhengzhou (CN); Qianli Xu, Zhengzhou (CN); Puyan Hou, Zhengzhou (CN)

(73) Assignees: CHINA PETROLEUM & CHEMICAL CORPORATION, Beijing (CN); CHINA PETROLEUM & CHEMICAL CO., LTD. OF NORTH BRANCH, Zhengzhou (CN)

( * ) Notice: Subject to any disclaimer, the term of this patent is extended or adjusted under 35 U.S.C. 154(b) by 0 days.

(21) Appl. No.: 18/487,134

(22) Filed: Oct. 16, 2023

(30) Foreign Application Priority Data

Oct. 26, 2022 (CN) .......................... 202211319147.8

(51) Int. Cl.
*C02F 1/68* (2023.01)
*C02F 101/10* (2006.01)
*C02F 103/10* (2006.01)
*C08B 37/08* (2006.01)

(52) U.S. Cl.
CPC .............. *C02F 1/68* (2013.01); *C08B 37/003* (2013.01); *C02F 2101/101* (2013.01); *C02F 2101/40* (2013.01); *C02F 2103/10* (2013.01); *C02F 2303/02* (2013.01)

(58) Field of Classification Search
CPC ...... C08B 37/003; C02F 1/68; C02F 2101/40; C02F 2101/101; C02F 2103/10; C02F 2303/02
See application file for complete search history.

(56) References Cited

U.S. PATENT DOCUMENTS

| 9,469,660 | B2 * | 10/2016 | Boday ................. B01J 20/3255 |
| 2005/0130847 | A1 | 6/2005 | Gatlin et al. |
| 2015/0175903 | A1 | 6/2015 | Compton et al. |
| 2017/0335204 | A1 | 11/2017 | Ekoue-Kovi et al. |
| 2021/0032548 | A1 | 2/2021 | Minamoto et al. |

FOREIGN PATENT DOCUMENTS

| CN | 1207052 | A | | 2/1999 |
| CN | 1583974 | A | | 2/2005 |
| CN | 105949349 | | * | 9/2016 |
| CN | 108676577 | A | | 10/2018 |
| CN | 111757773 | A | | 10/2020 |
| CN | 112710804 | A | | 4/2021 |
| CN | 113234473 | A | | 8/2021 |
| EA | 201991000 | A1 | | 10/2019 |
| JP | S63294924 | A | | 12/1988 |
| JP | 2005342611 | A | | 12/2005 |
| WO | 2008124404 | A1 | | 10/2008 |

OTHER PUBLICATIONS

Machine translation of CN 108676577. (Year: 2018).*

* cited by examiner

*Primary Examiner* — Leigh C Maier

(57) ABSTRACT

The invention discloses a biological desulfurizer for removing organic sulfur in fracturing flowback fluid and application thereof. The biological desulfurizer includes a compound with a triazine structure formed by modifying chitosan with aldehydes and inorganic salts. The triazine structure has a good removal effect on hydrogen sulfide and organic sulfur such as mercaptan and sulfide. The biological desulfurizer of the invention has a sulfur capacity of up to 250 g/kg and a desulfurization efficiency of over 95% in 15 min. It can effectively remove the stink of sulfur-containing working water, improve the working environment of the well site, and reduce the impact of sulfur compounds on the atmospheric environment during the development of oil and gas fields.

9 Claims, 3 Drawing Sheets

BIOLOGICAL DESULFURIZER FOR REMOVING ORGANIC SULFUR IN FRACTURING FLOWBACK FLUID AND APPLICATION THEREOF

FIELD OF THE DISCLOSURE

The disclosure relates to a biological desulfurizer for removing organic sulfur in fracturing flowback fluid and application thereof, which can be used for water treatment in oil-gas fields.

BACKGROUND

The main forms of sulfur in crude and gas include inorganic sulfides such as hydrogen sulfide, as well as organic sulfides such as mercaptan, thioether, carbonyl sulfide, carbon disulfide, and thiophene. The organic sulfur is the second largest sulfide component in sedimentary rocks after pyrite. With the development of unconventional oil and gas resources, acid fracturing technology has received widespread attention. Acid fracturing technology uses pressure to break open the formation and form fractures, and after injecting acid, forms acid corrosion fractures. After the completion of hydro-fracture construction, the organic sulfur in the stratum will be dissolved by the alcohol and surfactant solution in the fracturing flowback fluid and then flows back to the surface. The olfactory threshold of organic sulfur is very low, such as, the olfactory threshold of methanethiol is approximately 0.07 ppb, which is lower than the olfactory threshold of hydrogen sulfide (~0.41 ppb). Therefore, if the organic sulfur in the fracturing flowback fluid is not effectively treated, it will produce a foul odor and cause relatively serious environmental problems.

At present, desulfurizers mainly include alcoholamines, triazines, and ionic liquids. CN202111203356.1 discloses a composite ionic liquid desulfurizer and its preparation method and device for removing organic sulfur from gases, belonging to the field of sulfur-containing gas treatment. The desulfurizer is formed by mixing amino acid ionic liquids with organic solvents such as amines, alcohol amines, and sulfolane in a certain proportion; The desulfurizer removes organic sulfur from sulfur-containing gases, such as shale gas, natural gas, oil field gas, condensate gas, mine gas, and other industrial sulfur-containing gases. CN202111114858.7 discloses an improved organic desulfurizer and its application of blast furnace gas desulfurization, belonging to the fields of energy conservation and environmental protection. The desulfurizer uses ferric oxide and silica hydrogel as raw materials to form a silicon-oxygen-iron framework structure, and the silicon-oxygen-iron framework surface is loaded with 0.1%-5% sodium oxide/potassium oxide in molar ratio. The desulfurizer is heated to 150-280° C., and the dehydrated blast furnace gas is used as a reductant to reduce iron oxide to ferrous oxide by carbon monoxide. The reduction reaction continues until the concentration of carbon monoxide at the inlet and outlet of the blast furnace gas remains basically unchanged, and the activation is considered complete. Cooling the desulfurizer and using it for the conversion and absorption of organic sulfur in the blast furnace gas at 100-150° C.; among them, sodium oxide/potassium oxide serves as the activation center for the hydrolysis of organic sulfur, and ferrous oxide serves as an absorbent for hydrogen sulfide. CN201710708938.2 discloses a preparation method for a multifunctional desulfurizer for hydrolyzing, absorbing, and deoxidizing organic sulfur. Adding activated carbon to a mixed solution of $Zn(NO_3)_2$, $Fe(NO_3)_3$, and soluble salt of the first active additive, and then immersing it in equal volume under ultrasonic conditions and microwaving calcine to obtain the first semi-finished catalyst powder; adding acetic acid aqueous solution to the isopropanol solution of aluminum isopropoxide and tetrabutyl titanate, and microwave roasting to obtain $Al_2O_3$—$TiO_2$ composite powder; adding the $Al_2O_3$—$TiO_2$ composite powder to the soluble salt solution of the second auxiliary, and then immersing it in equal volume under ultrasonic conditions and microwaving calcine to obtain the second semi-finished catalyst powder; mixing the first semi-finished catalyst powder, the second semi-finished catalyst powder, binder, pore-forming agent and water, and then extrusion molding, drying, and roasting in a microwave oven to obtain the above multifunctional desulfurizer. CN201010210821.X discloses an efficient desulfurizer for removing hydrogen sulfide and organic mercaptans from mixed gases, including compound amine; The compound amine is composed of N-methyldiethanolamine, 2-[2-(tert-butylamino)ethoxy]ethanol, sulfolane, and 2-piperidinoethanol. The weight ratio of the compound amine to the desulfurizer is 70% to 85%; the weight ratio of sulfolane to the desulfurizer is 5% to 10%; the weight ratio of 2-piperidinoethanol to the desulfurizer is 10% to 20%. The invention uses a combination of physical and chemical solvents, enabling the desulfurizer of the invention to remove organic sulfur to a high extent while ensuring the effectiveness of $H_2S$ removal. The desulfurizer of the invention has a large acid gas load, enhances the reaction speed of $H_2S$ with MDEA and TBEE, and reduces the amount of desulfurizer used in the gas purification process, resulting in low energy consumption for solvent regeneration. CN201610780779.2 discloses a special desulfurizer for the deodorization process of kitchen waste, belonging to the field of waste treatment technology. The special desulfurizer uses activated sludge as a carrier, copper, iron, or manganese compounds as active components, and adopts the kneading method for extrusion molding; specifically, it is made by drying at 80-120° C. and roasting at 200-400° C. in an inert atmosphere. The invention also relates to a deodorization process by using the special desulfurizer in the treatment of kitchen waste, including odor collection, preferential adsorption of odor components, and catalytic combustion. The special desulfurizer of the invention can remove various sulfides, and has strong adsorption and removal performance for organic sulfur with high sulfur capacity.

However, the current desulfurization agents have the following four problems: 1) small sulfur capacity; 2) few agents suitable for on-site organic sulfur treatment in oil and gas fields; 3) high biological toxicity, which does not meet the requirements of green environmental protection; 4) the existing green biological desulfurizers have higher costs and longer treatment cycles.

SUMMARY

The present invention discloses a biological desulfurizer for removing organic sulfur in fracturing flowback fluid for solving the prior art's shortcomings. The biological desulfurizer can remove various sulfides from fracturing flowback fluid in oil and gas fields, and solve the impact of the stink on the environment To achieve the above technical objectives, the following technical solutions are adopted in this application:

In the first aspect, the present invention provides a biological desulfurizer for removing organic sulfur in fracturing flowback fluid. The biological desulfurizer is a compound with a triazine structure formed by modifying chitosan with aldehydes and inorganic salts.

During the flowback process of fracturing fluid in oil and gas fields, a stink is often generated, which can have a serious impact on the daily life and physical health of on-site operators and nearby residents. The cause of the stink is the presence of hydrogen sulfide and organic sulfur such as mercaptan, thioether and carbonyl sulfide in the formation. The current desulfurization agent has a small sulfur capacity and high biological toxicity, which does not meet the requirements of green environmental protection. The present invention uses biomass chitosan as raw material and modifies it with aldehydes and inorganic salts to form a triazine structure. The triazine structure can effectively remove hydrogen sulfide and organic sulfur such as mercaptan and thioether.

In the second aspect, the present invention provides a preparation method for the biological desulfurizer for removing organic sulfur in fracturing flowback fluid above. The preparation method includes the following steps:
(1) preparing a chitosan solution;
(2) adding aldehyde to the chitosan solution, adjusting the pH to 9-10, and quickly stirring at room temperature to obtain a reaction solution;
(3) adding inorganic salts to the reaction solution, heating and stirring for 5-8 h to obtain a mixed solution;
(4) steaming out the solvent in the mixed liquid under reduced pressure to obtain the biological desulfurizer.

The source of biomass chitosan is green and environmentally friendly. The present invention utilizes biomass chitosan as the main raw material to achieve effective recycling and reuse of waste biological resources. The chitosan is a compound with the following structural formula:

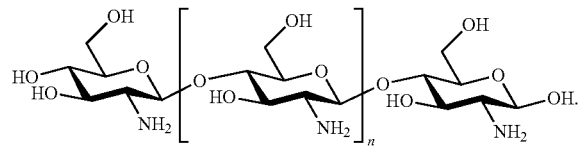

Preferably, the aldehyde is dialdehyde or multiple aldehyde.

Preferably, the dialdehyde is one or more of formaldehyde, glyoxal and glutaraldehyde, and the multiple aldehyde is paraformaldehyde. The paraformaldehyde is more preferred.

Preferably, the inorganic salts is one or more of iron chloride, ferrous chloride, aluminum chloride, iron sulfate, ferrous sulfate, and aluminum sulfate. The ferric chloride is more preferred.

Preferably, the dosage ratio of the chitosan to the aldehydes and the inorganic salts is 10 g: (100-300) mmol:(40-100) mmol.

Preferably, in the step (1), the chitosan is dissolved in a solution containing acetic acid and ethanol to obtain the chitosan solution. The mass percentage of acetic acid is 1%.

Preferably, in the step (2), the stirring speed is 300-500 r/min, and the stirring time is 20-30 min. Under mild conditions, the chitosan can condense with the dialdehyde or multiple aldehyde to form Schiff bases Preferably, in the step (3), the temperature for heating and stirring is 80-90° C.

In addition, the biological desulfurizer for removing organic sulfur in fracturing flowback fluid above is used to remove organic sulfur from fracturing flowback fluid in oil and gas fields.

The advantages of the present invention are as follows:
The present invention utilizes the primary amine (R—$NH_2$) in chitosan to condense with dialdehyde or multiple aldehyde under mild conditions to form Schiff bases, which are transformed into an imine structure. After the addition of inorganic coordination ions, the structure of the polycondensate is destroyed, and the coordination bonds are broken by further heating. And then the imine structure self-assembles to form a triazine structure, which has a good removal effect on hydrogen sulfide and organic sulfur such as mercaptan and thioether.

The biological desulfurizer of the present invention has a sulfur capacity of 250 g/kg and a desulfurization efficiency of over 95% within 15 min. It can effectively remove the stink of sulfur-containing working water, improve the working environment of the well site, and reduce the impact of sulfur-containing compounds on the atmospheric environment during the development of oil and gas fields.

The main raw material of the present invention is biomass chitosan, which can achieve effective recycling and utilization of waste biological resources, and is green and environmentally friendly.

BRIEF DESCRIPTION OF THE DRAWINGS

Accompanying drawings are for providing further understanding of embodiments of the disclosure. The drawings form a part of the disclosure and illustrate the principle of the embodiments of the disclosure along with the literal description. The drawings in the description below are merely some embodiments of the disclosure; a person skilled in the art can obtain other drawings according to these drawings without creative efforts. In the figures.

DETAILED DESCRIPTION OF PREFERRED EMBODIMENTS

The following is a clear and complete description of the technical solution in conjunction with some embodiments of the present invention. Obviously, the following embodiments are only a part of the embodiments of the present invention, not all of them. Based on the embodiments in the present invention, all other embodiments obtained by ordinary technical personnel in the art without creative labor fall within the scope of protection of the present invention.

Example 1

Weighing 10 g of chitosan and dissolving it in 400 mL of a solution of acetic acid and ethanol to prepare a chitosan solution, wherein the mass percentage of acetic acid is 1%. And then adding 100 mmol of paraformaldehyde into the chitosan solution, and adjusting the pH of the reaction solution to 10 by using hydrochloric acid or sodium hydroxide. After stirring at 300 r/min for 20 min at room temperature, adding 50 mmol of ferric chloride and stirring for 5 hours under constant temperature water bath conditions of 80° C. After the completion of the reaction, the solvent is evaporated under reduced pressure to obtain a powdered biological desulfurizer, which is then dried at 50° C. for later use.

Example 2

Weighing 10 g of chitosan and dissolving it in 400 mL of a solution of acetic acid and ethanol to prepare a chitosan solution, wherein the mass percentage of acetic acid is 1%. And then adding 100 mmol of glutaraldehyde into the chitosan solution, and adjusting the pH of the reaction solution to 9 by using hydrochloric acid or sodium hydroxide. After stirring at 300 r/min for 30 min at room temperature, adding 40 mmol of ferric chloride and stirring for 5 hours under constant temperature water bath conditions of 85° C. After the completion of the reaction, the solvent is evaporated under reduced pressure to obtain a powdered biological desulfurizer, which is then dried at 50° C. for later use.

Application Example 1

Figure 1:
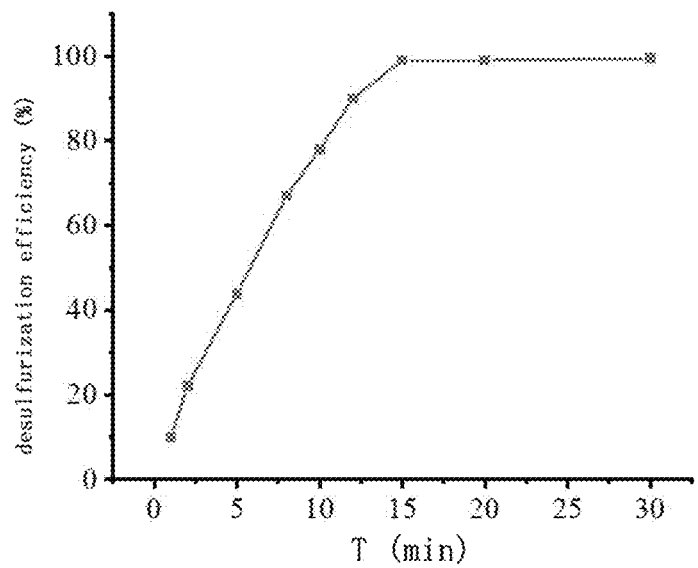
FIG. 1 shows the desulfurization efficiencies at different processing times in Example 1.

Adding the biological desulfurizer prepared in Example 1 to the fracturing back-flow fluid with a clear stink, and stirring at 1500 r/min for 30 min, where the concentration of the biological desulfurizer in the fracturing back-flow fluid is 200 mg/L. FIG. 1 shows the desulfurization efficiency of organic sulfur under different treatment times. From FIG. 1, it can be seen that the desulfurizer of the present invention has no stink in the fracturing back-flow fluid after 15 min of treatment, and the desulfurization efficiency reaches over 95%, indicating a significant removal effect on sulfides.

Using a gas chromatograph to detect the gas chromatographic peaks of organic sulfur by headspace sampling method, and calculating the desulfurization efficiency of organic sulfur based on the changes in peak area before and after the addition of desulfurizer. The specific calculation method for the desulfurization efficiency of organic sulfur is as follows:

$$\varphi = \left(1 - \frac{A_2}{A_1}\right) \times 100\%$$

In the above equation: φ Is the desulfurization rate of organic sulfur; $A_1$ and $A_2$ are the gas chromatographic peak areas of organic sulfur pollutants in the fracturing back-flow fluid before and after treatment respectively. The analysis conditions for gas chromatography are as follows: HP-PLOT-Q capillary column; He serves as the carrier gas with a flow rate of 1.0 mL/min and a purge rate of 6.0 mL/min; the sample inlet temperature is 200° C., and the initial column oven temperature of the column temperature program is 60° C.; the temperature is raised at a rate of 20° C./min to 160° C., followed by a rate of 5° C./min to 190° C.; finally, the temperature is raised at a rate of 30° C./min to 220° C. and held for 12 min; headspace injection: using a headspace device, heating the sample to 80° C., and using nitrogen to drive out the volatile gas for detection; the detector is a pulse flame photometric detector (PFPD).

Application Example 2

Figure 2A:
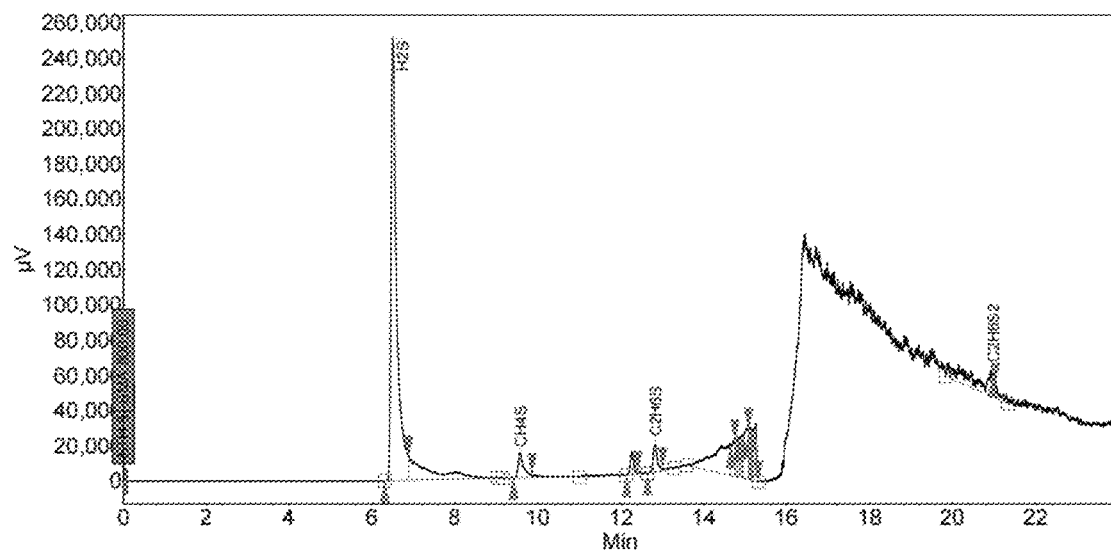
FIG. 2A is a gas chromatogram of organic sulfur detection in fracturing flowback fluid before treatment in Example 2.
Figure 2B:
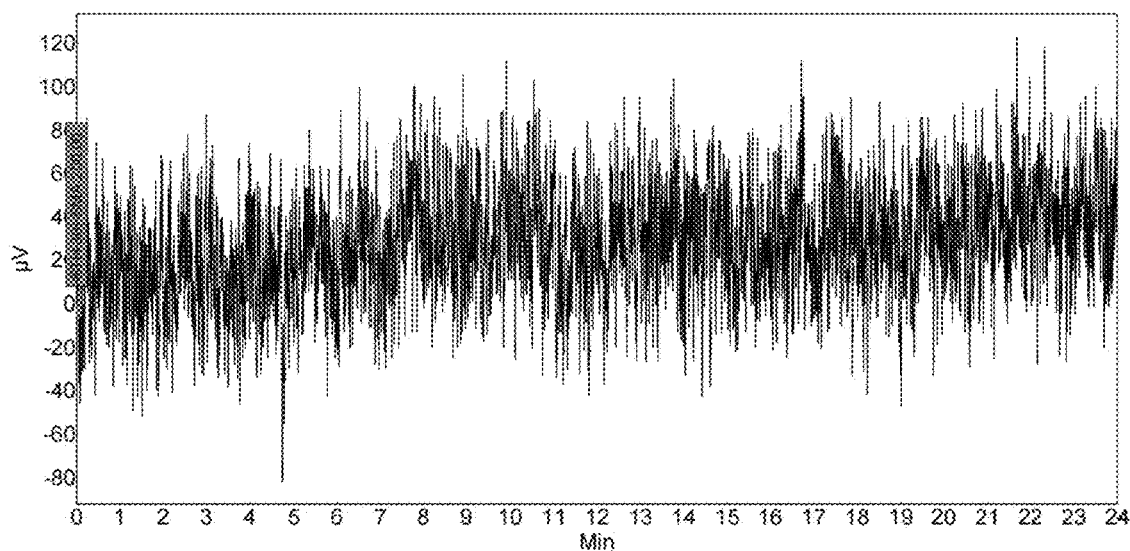
FIG. 2B is a gas chromatogram of organic sulfur detection in fracturing flowback fluid after treatment in Example 2.

Adding the biological desulfurizer prepared in Example 2 to the fracturing back-flow fluid with a clear stink, and stirring at 1500 r/min for 20 min, where the concentration of the biological desulfurizer in the fracturing back-flow fluid is 300 mg/L. FIG. 2A shows the gas chromatography of organic sulfur detection in the fracturing back-flow fluid before treatment, and FIG. 2B shows the gas chromatography of organic sulfur detection in the fracturing back-flow fluid after treatment. From FIGS. 2A and 2B, it can be seen that the desulfurizer of the present invention can significantly remove hydrogen sulfide and organic sulfur such as mercaptan and sulfide. This indicates that the biological desulfurizer of the present invention can simultaneously remove multiple sulfides in the fracturing flowback fluid of oil and gas fields, and has strong removal ability for organic sulfur and high sulfur capacity.

Comparative Example 1

Figure 3A:
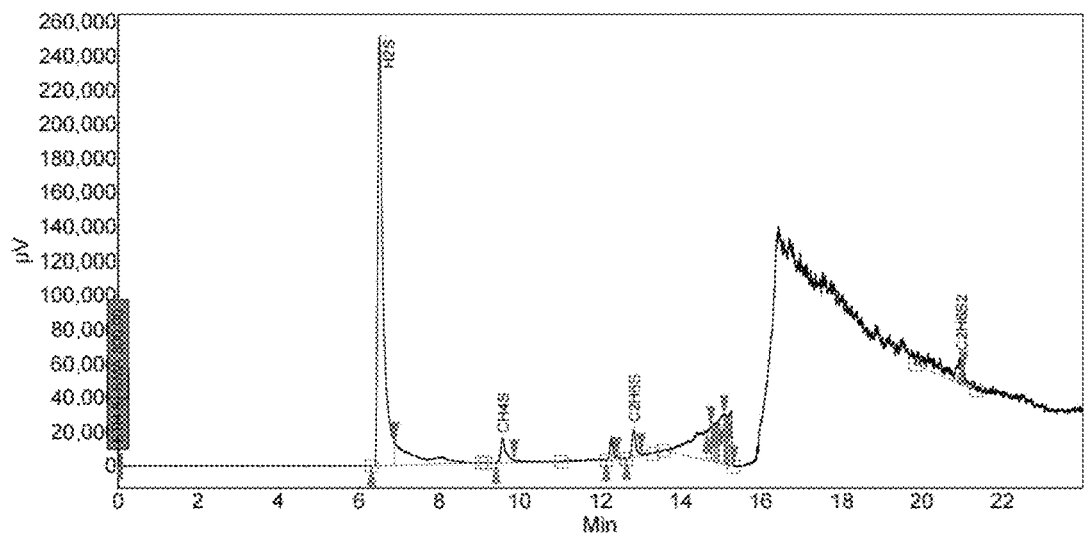
FIG. 3A is a gas chromatogram of organic sulfur detection in fracturing flowback fluid before treatment with desulfurizer s-triazine-1,3,5-triethanol in Comparative Example 1.
Figure 3B:
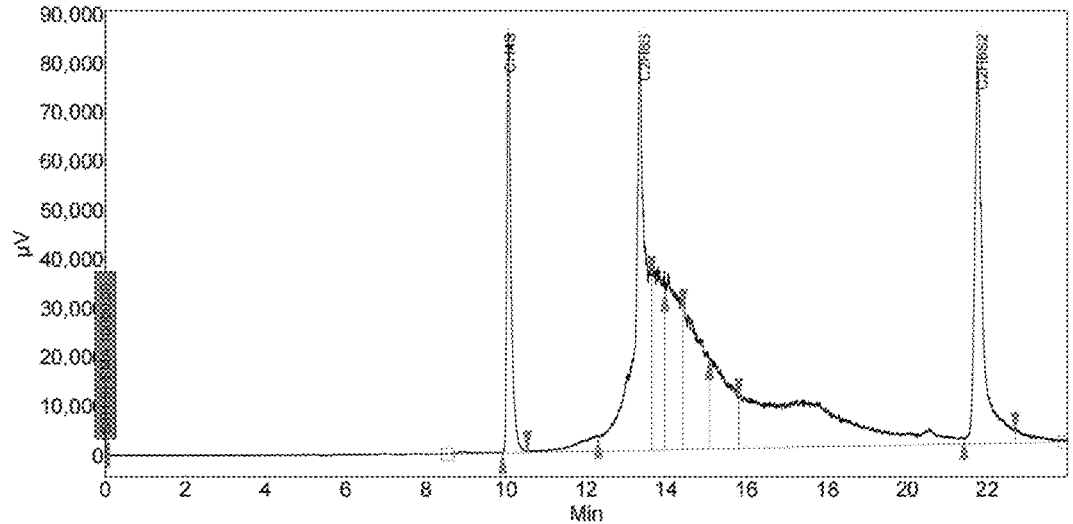
FIG. 3B is a gas chromatogram of organic sulfur detection in fracturing flowback fluid after treatment with desulfurizer s-triazine-1,3,5-triethanol in Comparative Example 1.

Adding the desulfurizer s-triazine-1,3,5-triethanol to the fracturing back-flow fluid with a clear stink, and stirring at 1500 r/min for 30 min, where the concentration of the desulfurizer in the fracturing back-flow fluid is 300 mg/L. After treatment, the fracturing flowback fluid still has a stink. FIG. 3A shows the gas chromatography of the fracturing flowback fluid before treatment, and FIG. 3B shows the gas chromatography of the fracturing flowback fluid after treatment. From FIGS. 3A and 3B, it can be seen that the desulfurizer s-triazine-1,3,5-triethanol only has a good removal effect on hydrogen sulfide, but there is still a large amount of organic sulfur such as mercaptan and sulfide in the fracturing flowback fluid.

Comparative Example 2

Figure 4A:
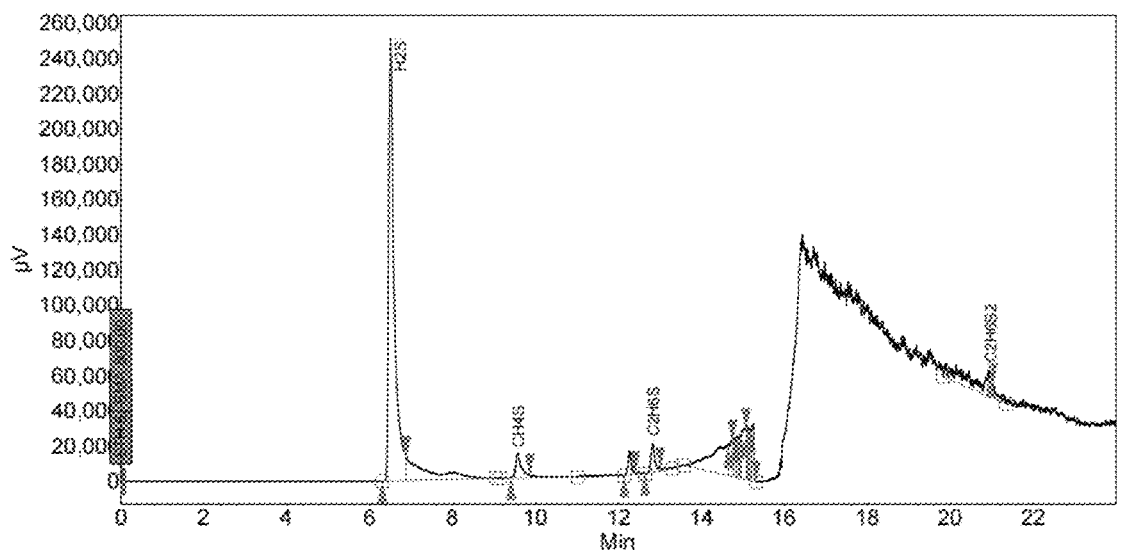
FIG. 4A is a gas chromatogram of organic sulfur detection in fracturing flowback fluid before treatment with desulfurizer 2-aminoethanol in Comparative Example 2.
Figure 4B:
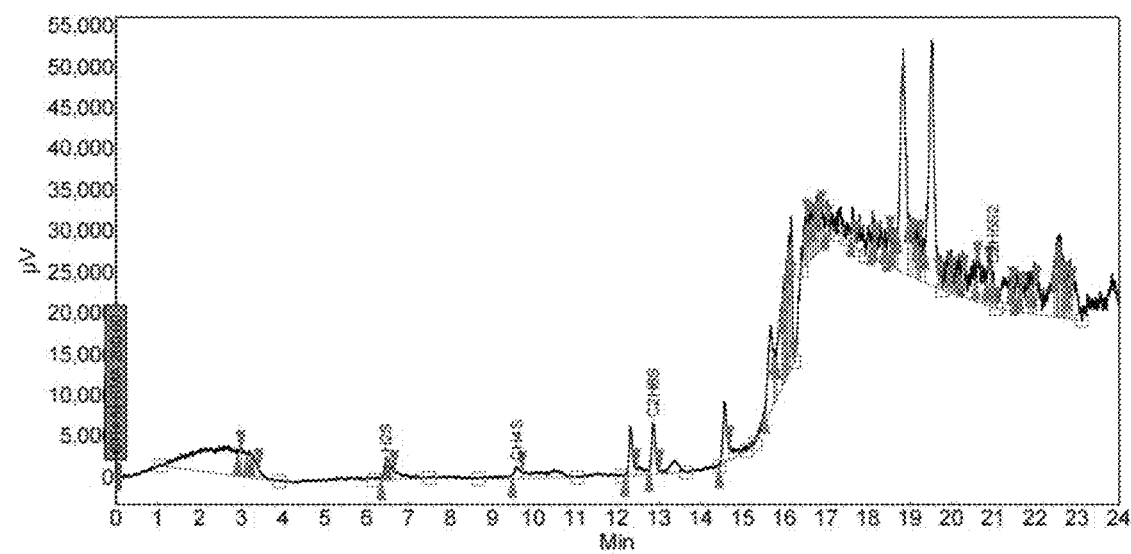
FIG. 4B is a gas chromatogram of organic sulfur detection in fracturing flowback fluid after treatment with desulfurizer 2-aminoethanol in Comparative Example 2.

Adding the desulfurizer 2-aminoethanol to the fracturing back-flow fluid with a clear stink, and stirring at 1500 r/min for 30 min, where the concentration of the desulfurizer in the fracturing back-flow fluid is 300 mg/L. After treatment, the fracturing flowback fluid still has a stink. FIG. 4A shows the gas chromatography of the fracturing flowback fluid before treatment, and FIG. 4B shows the gas chromatography of the fracturing flowback fluid after treatment. From FIGS. 4A and 4B, it can be seen that hydrogen sulfide and organic sulfur compounds such as mercaptan and thioether can still be detected in the fracturing flowback fluid treated with the desulfurizer 2-aminoethanol.

The results from all drawings indicate that the biological desulfurizer prepared by the present invention uses biomass chitosan as raw material and is modified with aldehydes and inorganic salts. The biological desulfurizer has a large triazine structure and high desulfurization efficiency, which can be used for the effective removal of hydrogen sulfide and organic sulfur in the fracturing flowback fluid of oil and gas fields, thereby solving the impact of stinks on the environment.

The above descriptions are only preferred embodiments of the present invention and are not intended to limit the present invention. Any modification, equivalent replacement, improvement, etc., made within the spirit and principle of the present invention shall be included in the protection of the present invention.

What is claimed is:

1. A biological desulfurizer for removing organic sulfur in fracturing flowback fluid, comprising a compound with a triazine structure formed by modifying chitosan with aldehydes and inorganic salts;

the preparation method of the biological desulfurizer includes the following steps:

(1) preparing a chitosan solution;

(2) adding aldehyde to the chitosan solution, adjusting the pH to 9-10, and quickly stirring at room temperature to obtain a reaction solution;

(3) adding inorganic salts to the reaction solution, heating and stirring for 5-8 h to obtain a mixed solution;

(4) steaming out the solvent in the mixed liquid under reduced pressure to obtain the biological desulfurizer.

2. The biological desulfurizer for removing organic sulfur in fracturing flowback fluid according to claim 1, wherein the aldehyde is dialdehyde or multiple aldehyde.

3. The biological desulfurizer for removing organic sulfur in fracturing flowback fluid according to claim 2, wherein the dialdehyde is one or more of formaldehyde, glyoxal and glutaraldehyde, and the multiple aldehyde is paraformaldehyde.

4. The biological desulfurizer for removing organic sulfur in fracturing flowback fluid according to claim 1, wherein the inorganic salts is one or more of iron chloride, ferrous chloride, aluminum chloride, iron sulfate, ferrous sulfate, and aluminum sulfate.

5. The biological desulfurizer for removing organic sulfur in fracturing flowback fluid according to claim 1, wherein the dosage ratio of the chitosan to the aldehydes and the inorganic salts is 10 g: (100-300) mmol:(40-100) mmol.

6. The biological desulfurizer for removing organic sulfur in fracturing flowback fluid according to claim 1, in the step (1), the chitosan is dissolved in a solution containing acetic acid and ethanol to obtain the chitosan solution.

7. The biological desulfurizer for removing organic sulfur in fracturing flowback fluid according to claim 1, in the step (2), the stirring speed is 300-500 r/min, and the stirring time is 20-30 min.

8. The biological desulfurizer for removing organic sulfur in fracturing flowback fluid according to claim 1, in the step (3), the temperature for heating and stirring is 80-90° C.

9. The biological desulfurizer for removing organic sulfur in fracturing flowback fluid according to claim 1 is used to remove organic sulfur from fracturing flowback fluid in oil and gas fields.

* * * * *